United States Patent [19]
Bayer

[11] Patent Number: 6,142,674
[45] Date of Patent: Nov. 7, 2000

[54] BALL BEARING FOR HIGH ROTATIONAL SPEEDS

[75] Inventor: Oswald Bayer, Aidhausen, Germany

[73] Assignee: FAG Aircraft/Super Precision Bearings GmbH, Germany

[21] Appl. No.: 09/315,642

[22] Filed: May 20, 1999

[51] Int. Cl.$^7$ .................................................. F16C 19/04
[52] U.S. Cl. .................... 384/482; 384/492; 384/513; 384/907.1; 384/912; 384/913
[58] Field of Search ..................... 384/482, 492, 384/513, 907.1, 912, 913

[56] References Cited

U.S. PATENT DOCUMENTS 5,873,956  2/1999  Tanaka et al. ........................ 384/492
5,997,661  12/1999 Matsumoto et al. .................... 384/912

*Primary Examiner*—Lenard A. Footland
*Attorney, Agent, or Firm*—Ostrolenk, Faber, Gerb & Soffen, LLP

[57] ABSTRACT

A bearing which is wear-free and optimal in terms of loading at very high rotational speeds and even in the case of self-aligning bearings with point contact. bearing uses balls made of ceramic and raceways of X 30 Cr Mo N 15-1. A radial clearance of between 0.0005 and 0.0007 times the bore diameter of the inner race is provided. One race may be planar and the other profiled to the balls. The planar race may be slightly convex to the balls or may be conical.

6 Claims, 1 Drawing Sheet

BALL BEARING FOR HIGH ROTATIONAL SPEEDS

BACKGROUND OF THE INVENTION

The present invention relates to a ball bearing adapted for high speeds, by choice of materials and profiling of the races.

Many measures to make ball bearings suitable for high rotational speeds have been proposed. Hollow balls or ceramic balls are generally known for this purpose. Use of a bearing equipped in this way as a self-aligning bearing is suggested, for example in EP-B 342 172, wherein a bearing has one raceway which is designed to be planar. Relative axial displacement of the raceways can take place without problems in the region of the shoulder-free, planar running surfaces. However, these measures are not sufficient in many applications because of the point contact between the balls and the planar running surface, where it is possible for these parts to wear. This risk is increased if the prestress or radial clearance which is correct for high rotational speeds is not provided. This is because, at too high prestress, the friction and hence the bearing temperature are also impermissibly increased. Self-aligning bearings operable at high rotational speeds are primarily needed in motor spindles.

The object was previously achieved by using spindle bearings which are installed so that they can move axially with respect to a housing. This has the disadvantage that, with a small clearance, operational changes mean that the displaceability is no longer ensured or high displacement forces are needed. This disadvantage is to some extent overcome by specific devices, for example, linear bearings, but with a high expenditure. When cylinder roller bearings are used, the rotational speed is restricted.

SUMMARY OF THE INVENTION

It is an object of the present invention to provide a ball bearing which does not have the above disadvantages and, even when operated at very high rotational speed (for example $n \times d_m > 10^6$), even in the case of a self-aligning bearing with point contact, a bearing which is wear-free and optimal in terms of loading is provided.

The object is achieved by using bearing balls comprised of ceramic for and by using X 30 Cr Mo N 15-1 for the raceways to achieve a high-quality bearing. However, it is still essential to correct the bearing clearance. This is because, at very high rotational speeds, the inner race expands and then produces a prestress, which often becomes too large and therefore places an additional load on the bearing. These relationships do not occur if a radial clearance is selected which is 0.0005 to 0.0007 times the bore diameter of the inner race. This range is particularly suitable, since, by using this clearance, adequate seating of the bearing, both on the shaft and in the housing, and favorable operating play are achieved.

Furthermore, one raceway is provided with shoulders while the other raceway is substantially planar, including being slightly convex toward the balls or being slightly concavely conical.

Other objects and features of the present invention are explained with reference to the drawings.

DESCRIPTION OF A PREFERRED EMBODIMENT

Figure 1:
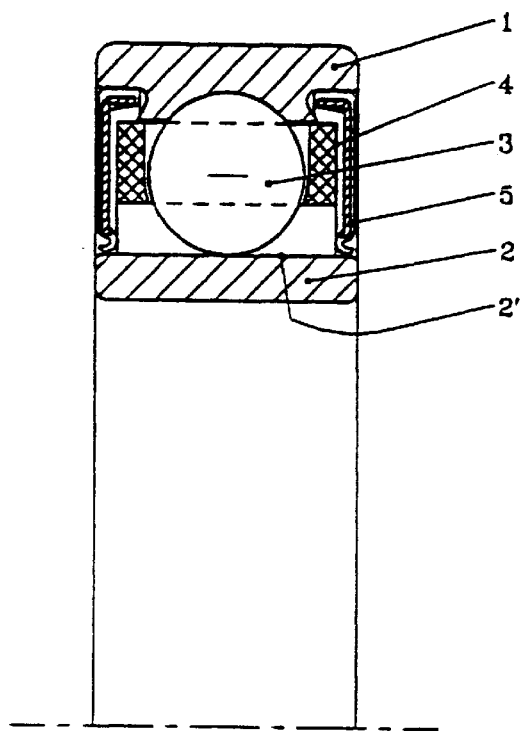
FIG. 1 shows a bearing according to the invention in partial longitudinal section and FIG. 2 shows a variant of the bearing according to FIG. 1.

In FIG. 1, the ball bearing according to the invention comprises an outer race 1, an inner race 2 spaced radially upward from the outer race and a ram of bearing balls 3 arranged between the races. The balls 3 are guided and retained by a normal bearing cage 4. A covering or sealing washer 8 is provided at one or both axial sides of the bearing.

Both raceways 1 and 2, and particularly, their surfaces, are formed of X 30 Cr Mo N 15-1. The balls 3 are formed of ceramic material of low weight. For this reason, lower centrifugal forces and hence higher rotational speeds can be achieved than with steel balls. By setting the required radial clearance of 0.0005 to 0.0007 times the bore diameter of the inner race, a ball bearing which is well able to withstand stresses at high rotational speed is produced.

Figure 2:
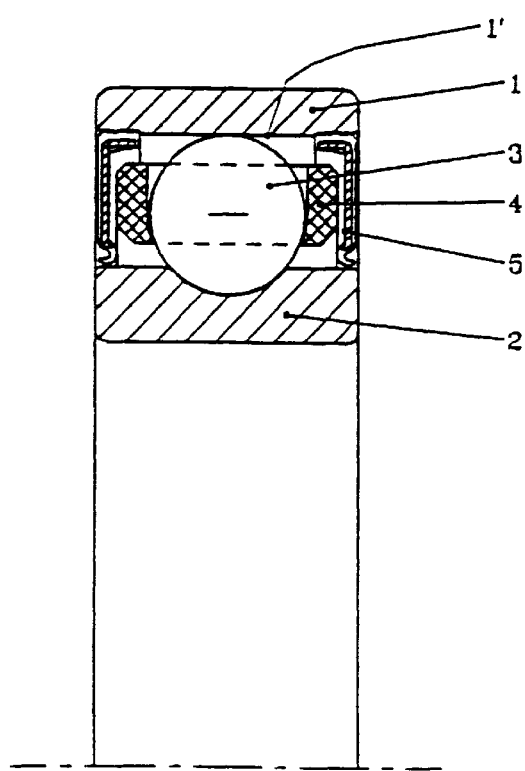

A self-aligning bearing effect is achieved here by the fact that the running surface 2' of the inner race 2 is a planar surface. The outer race is profiled to the shape of the ball with shoulders at both axial sides. In FIG. 2 variant, the self-aligning bearing effect is achieved by providing a planar running surface 1' on the outer race 1. Otherwise, the bearing in FIG. 2 corresponds to that in FIG. 1.

With a mass produced bearing, it is sometimes necessary to subsequently carry out further adaptations to the surrounding parts of the bearing. For example, it is possible for the planar running surface 1' or 2' of one race to be provided with a conical shape with a preferably 20 inclination and/or for the bore of the inner race 2 to be of conical design. In both cases, by displacing the respective raceway axially, a reduction in the radial clearance between opposing raceways is achieved. In the latter case, it is also necessary for the seating surface of the raceway to be of conical design.

Slightly convex profiling of the planar running track with respect to the balls enables the axial displacement of the respective raceway, which often occurs in the case of a self-aligning bearing, to not be impeded.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ball bearing for operating at high rotational speeds, comprising an inner and outer raceway, which are radially spaced apart; one of the raceways having shoulders and the other of the raceways having a planar running surface that is generally planar in longitudinal section;

the raceways being comprised of material X 30 Cr Mo N 15-1;

bearing balls comprised of ceramic materials running on and placed between the raceways;

the radial clearance of the bearing between the raceways lies in a range which is 0.0005 to 0.0007 times the bore diameter of the inner raceway.

2. The ball bearing of claim 1, wherein the planar running surface has a slight conical shape.

3. The ball bearing of claim 2, wherein the conical shape of the planar running surface has a 2° inclination.

4. The ball bearing of claim 1, wherein the inner race has a bore of conical shape.

5. The ball bearing of claim 1, wherein the planar running surface has a profile which is slightly convex with respect to the balls running on the raceways.

6. The ball bearing of claim 1, wherein the bearing has opposite axial and further comprises a sealing washer at at least one axial side of the bearing.

* * * * *